(12) United States Patent
Teng et al.

(10) Patent No.: US 6,731,444 B2
(45) Date of Patent: May 4, 2004

(54) HEAD-DISC ASSEMBLY WITH EMBEDDED PRODUCT IDENTIFICATION CODE

(75) Inventors: JackMing Teng, Singapore (SG); BaoHong Liu, Singapore (SG); KianKeong Ooi, Singapore (SG); WingKong Chiang, Singapore (SG); Mingzhong Ding, Singapore (SG); BengWee Quak, Singapore (SG); Djunaedy Chandra Ang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 255 days.

(21) Appl. No.: 09/872,945

(22) Filed: Jun. 1, 2001

(65) Prior Publication Data

US 2002/0060870 A1 May 23, 2002

Related U.S. Application Data

(60) Provisional application No. 60/236,311, filed on Sep. 28, 2000, and provisional application No. 60/236,319, filed on Sep. 28, 2000.

(51) Int. Cl.[7] .................................................. G11B 5/09
(52) U.S. Cl. .............................. 360/48; 360/69; 360/75; 360/77.08; 360/78.14
(58) Field of Search .............................. 360/48, 49, 47, 360/53, 69, 39, 40, 31, 77.08, 78.14, 75; 235/375, 449; 369/59.25, 52.1, 53.2

(56) References Cited

U.S. PATENT DOCUMENTS

| | | | |
|---|---|---|---|
| 5,262,907 A | 11/1993 | Duffy et al. | |
| 5,940,854 A | 8/1999 | Green, Jr. et al. | |
| 6,057,981 A | 5/2000 | Fish et al. | |
| 6,091,560 A | 7/2000 | Du | |
| 6,118,632 A | 9/2000 | Albrecht et al. | |
| 6,154,790 A | 11/2000 | Pruett et al. | |
| 6,433,948 B1 * | 8/2002 | Lee | 360/75 |

* cited by examiner

Primary Examiner—Alan T. Faber
(74) Attorney, Agent, or Firm—Fellers, Snider, et al.

(57) ABSTRACT

An apparatus and method for writing a product information code (PIC) to a head-disc assembly (HDA) of a disc drive data handling system to facilitate subsequent identification of the HDA. The PIC is configured as a sequence of n multi-bit encoded words. Servo data are written to a disc of the HDA as a number of p angularly spaced apart servo data fields, the servo data used by a servo control circuit to effect head positional control. The n encoded words are distributed across a subset n of the p servo data fields so that the n encoded words replace at least a portion of the servo data in the n servo data fields. Preferably, the n encoded words are written to Gray code (track address) fields of the n servo data fields and are provided with error detection and correction capabilities.

21 Claims, 7 Drawing Sheets

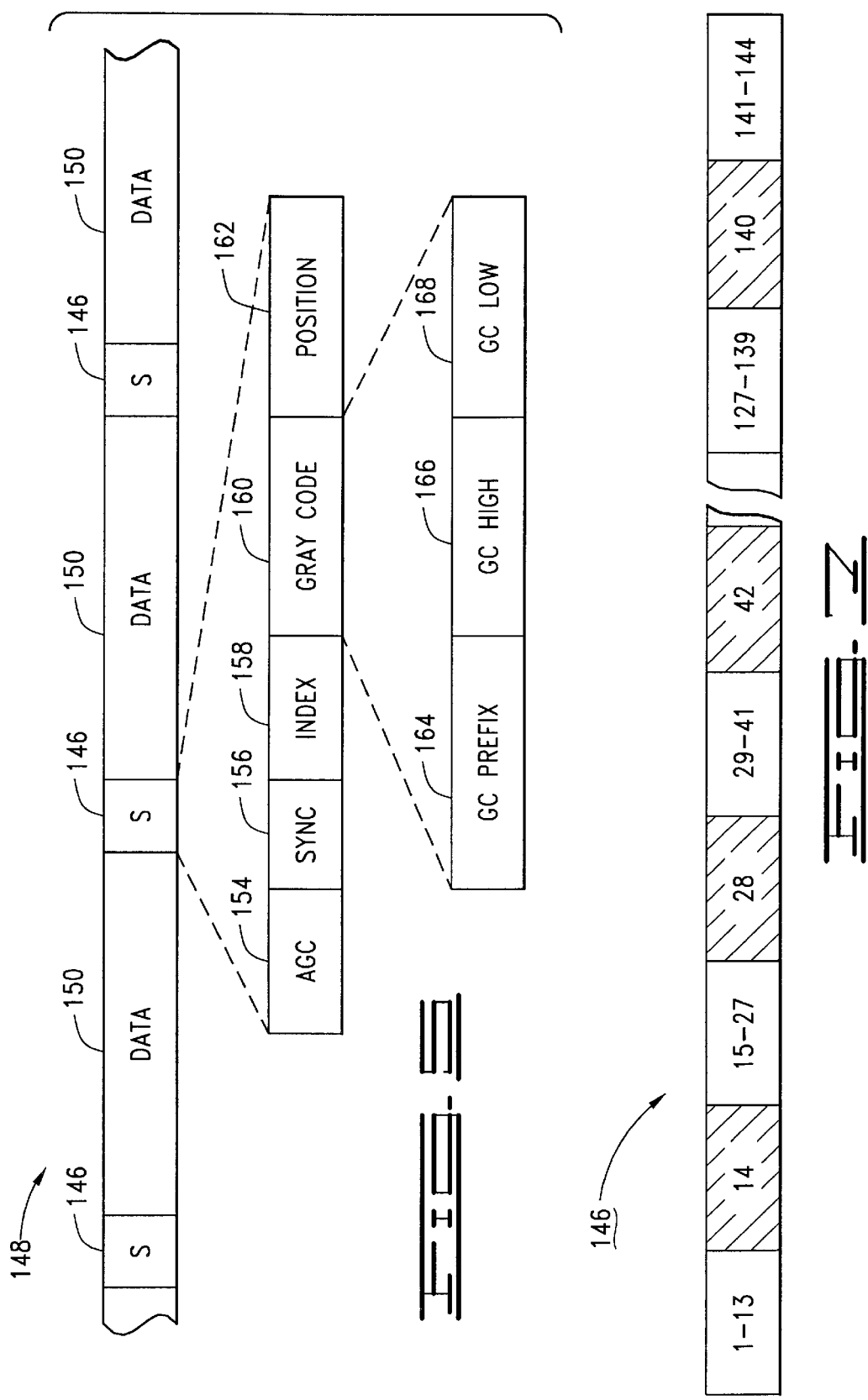

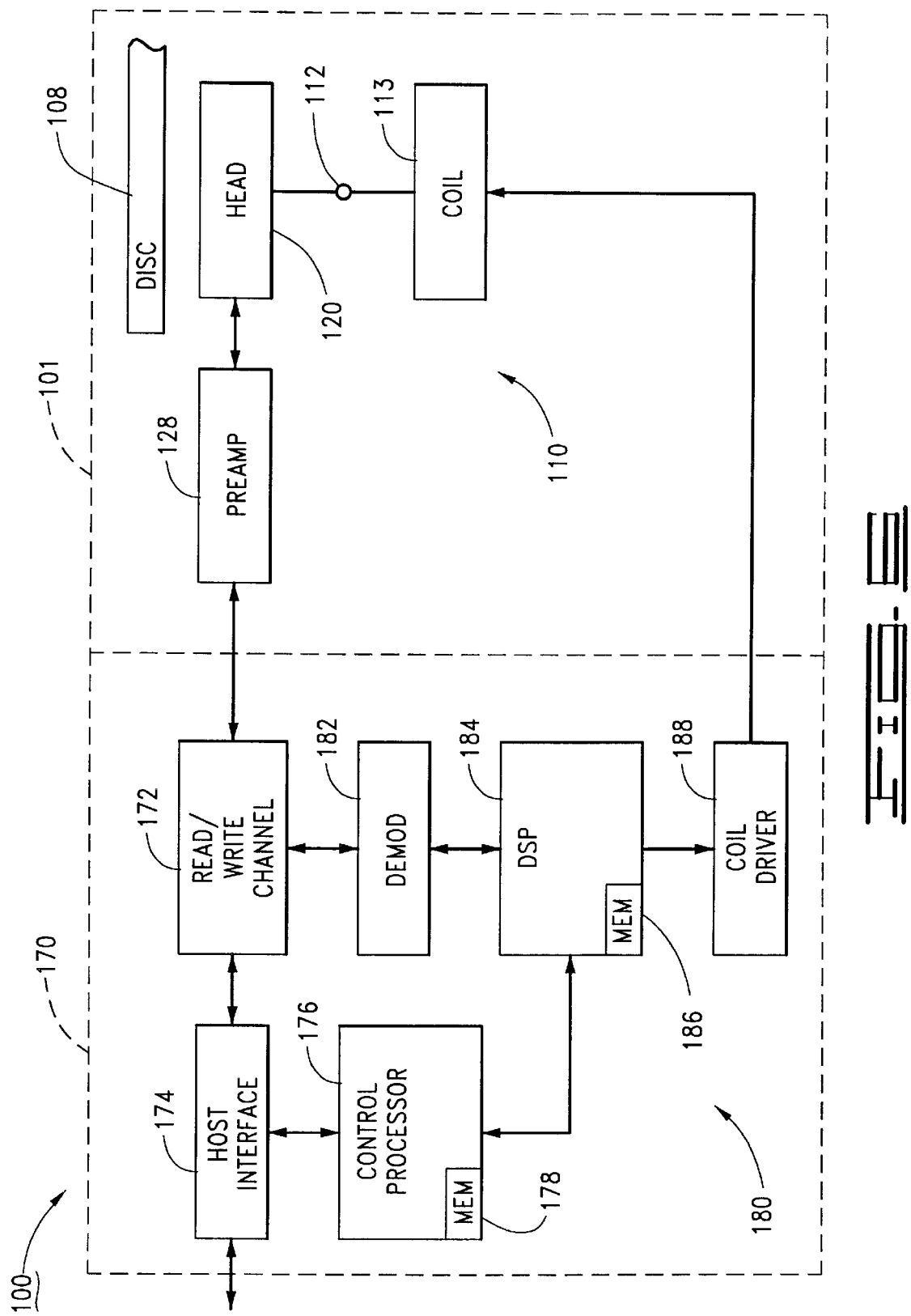

| | BINARY PARITY BIT 3 2 1 0 4 | ASCII 6 5 4 3 2 1 0 | GRAYCODE BINARY REP 15 14 13 12 11 10 9 8 7 6 5 4 3 2 1 0 | HEX REP |
|---|---|---|---|---|
| "G" | 1 1 1 1 1 | 1 0 0 0 1 1 1 | 1 1 1 1 1 1 1 1 0 0 0 1 1 1 1 1 | FF1F |
| "H" | 1 1 1 1 1 | 1 0 0 1 0 0 0 | 1 1 1 1 1 1 1 1 0 0 1 1 0 0 0 1 | FF31 |
| "I" | 0 1 1 0 0 | 1 0 0 1 0 0 1 | 0 1 1 1 0 0 1 1 0 0 1 1 0 0 1 1 | 7333 |
| "J" | 0 1 1 1 0 | 1 0 0 1 0 1 0 | 0 1 1 1 0 1 1 1 0 0 1 1 0 1 0 1 | 7735 |
| "K" | 1 1 1 1 0 | 1 0 0 1 0 1 1 | 1 1 1 1 1 0 1 1 0 0 1 1 0 1 1 1 | FB37 |
| "L" | 1 0 1 0 0 | 1 0 0 1 1 0 0 | 1 0 1 1 0 0 1 1 0 0 1 1 1 0 0 1 | B339 |
| "M" | 0 0 1 1 1 | 1 0 0 1 1 0 1 | 0 0 1 1 1 1 1 1 0 0 1 1 1 0 1 1 | 3F3B |
| "N" | 0 0 1 1 0 | 1 0 0 1 1 1 0 | 0 0 1 1 1 0 1 1 0 0 1 1 1 1 0 1 | 3B3D |
| "O" | 1 0 1 0 1 | 1 0 0 1 1 1 1 | 1 0 1 1 0 1 1 1 0 0 1 1 1 1 1 1 | B73F |
| "P" | 1 1 0 0 0 | 1 0 1 0 0 0 0 | 1 1 0 1 0 0 1 1 0 1 0 1 0 0 0 1 | D351 |
| "Q" | 0 1 0 1 1 | 1 0 1 0 0 0 1 | 0 1 0 1 1 1 1 1 0 1 0 1 0 0 1 1 | 5F53 |
| "R" | 0 1 0 1 0 | 1 0 1 0 0 1 0 | 0 1 0 1 1 0 1 1 0 1 0 1 0 1 0 1 | 5B55 |
| "S" | 1 1 0 0 1 | 1 0 1 0 0 1 1 | 1 1 0 1 0 1 1 1 0 1 0 1 0 1 1 1 | D757 |
| "T" | 1 0 0 0 1 | 1 0 1 0 1 0 0 | 1 0 0 1 1 1 1 1 0 1 0 1 1 0 0 1 | 9F59 |
| "U" | 0 0 0 0 0 | 1 0 1 0 1 0 1 | 0 0 0 1 0 0 1 1 0 1 0 1 1 0 1 1 | 135B |
| "V" | 0 0 0 0 1 | 1 0 1 0 1 1 0 | 0 0 0 1 0 1 1 1 0 1 0 1 1 1 0 1 | 175D |
| "W" | 1 0 0 1 0 | 1 0 1 0 1 1 1 | 1 0 0 1 1 0 1 1 0 1 0 1 1 1 1 1 | 9B5F |
| "X" | 1 0 0 1 0 | 1 0 1 1 0 0 0 | 1 0 0 1 1 0 1 1 0 1 1 1 0 0 0 1 | 9B71 |
| "Y" | 0 0 0 0 1 | 1 0 1 1 0 0 1 | 0 0 0 1 0 1 1 1 0 1 1 1 0 0 1 1 | 1773 |
| "Z" | 0 0 0 0 0 | 1 0 1 1 0 1 0 | 0 0 0 1 0 1 1 1 0 1 1 1 0 1 0 1 | 1375 |

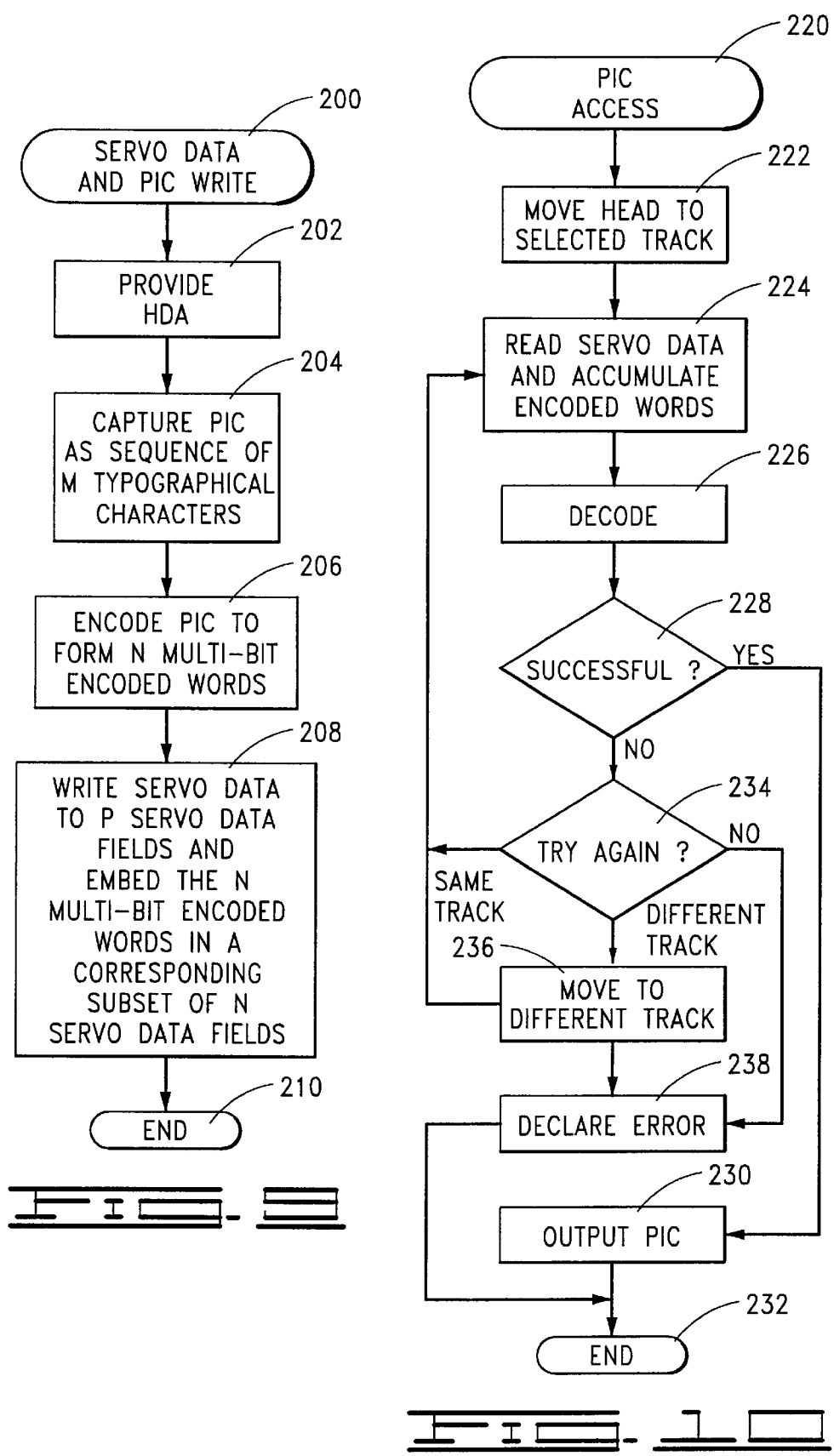

HEAD-DISC ASSEMBLY WITH EMBEDDED PRODUCT IDENTIFICATION CODE

RELATED APPLICATIONS

This application claims priority to Provisional Applications Nos. 60/236,311 and 60/236,319, both filed Sep. 28, 2000.

FIELD THE INVENTION

This invention relates generally to the field of data handling devices, and more particularly, but not by way of limitation, to a method and apparatus for embedding a product identification code in servo fields of a disc drive head-disc assembly.

BACKGROUND

Disc drives are data handling systems used to magnetically store and retrieve digital data files. A typical disc drive comprises two main assemblies: (1) a head-disc assembly constituting the major mechanical systems of the disc drive; and (2) a printed circuit board assembly which incorporates communication and control electronics for the drive.

A typical head-disc assembly (HDA) comprises a rigid base deck that cooperates with a top cover to form a sealed housing. Supported within the housing are one or more rigid magnetic storage discs arranged about a spindle motor for rotation at a constant high speed. A corresponding array of read/write heads are provided to transfer data between tracks defined on the disc surfaces and a host device (such as a computer) in which the disc drive is mounted. The heads are mounted to a rotary actuator assembly and are controllably positioned adjacent the tracks through the application of current to an actuator motor (such as a voice coil motor, VCM).

The disc drive printed circuit board assembly (PCBA) is typically mounted to an exterior surface of the HDA. The PCBA supports a top-level processor which controls disc drive operation, read/write channel circuitry used to transfer data between the host computer and the discs, and servo control circuitry which operates as a closed loop control system to control the position of the heads. The servo control circuitry detects head position from servo data stored in servo fields on the discs. The servo data are typically written to the discs during a servo track writing operation that takes place during HDA manufacturing.

In disc drives of the present generation, it is typical to use an embedded servo scheme whereby both servo data and user data are stored on each of the tracks. The servo data are typically arranged as a series of radially extending servo wedges, like spokes on a wheel. Each servo wedge comprises adjacent servo fields that are radially and angularly aligned, with one series of servo fields provided to each particular track. During a disc drive formatting operation, data fields ("data sectors") are formed on the tracks in the areas between adjacent servo fields, with each data field configured to store a fixed-size block of data, such as 512 bytes.

The data fields are primarily provided to store user data from the user of the host device, and most of the tracks on the disc surfaces are provided for this purpose. However, it has been found advantageous to provide a small number of non-user accessible tracks at the edges of the discs (sometimes referred to as "hidden" or "guard band" tracks). The data fields on these tracks are a convenient location to store control data to parametrically configure the disc drive electronic systems (e.g., the read/write channel and servo circuit). During an initialization routine during which the disc drive is powered up, the heads can be caused to access and load the control data into a volatile memory device (such as dynamic random access memory, DRAM) on the PCBA. Thereafter, as various heads are moved to different locations on the disc surfaces during normal drive operation, the appropriate parameters for the particular head/disc location can be loaded and used by the disc drive electronics to optimize drive performance.

In high-volume manufacturing environments in which hundreds, if not thousands of nominally identical disc drives are produced daily, it has been found advantageous to assign each HDA a unique product identification code. Such code can comprise a unique serial number and/or a configuration code indicative of a particular mechanical configuration or revision level of the HDA. Such product identification codes are often expressed as a multi-character alphanumeric code, and stored in bar-code format on an external label applied to an exterior surface of the HDA housing. In this way, optical scanners (bar code readers) can be used throughout the manufacturing process to register movement of the HDA to various manufacturing assembly and test stations. This promotes the efficient tracking of the HDA and helps ensure that appropriate operations are performed based on the particular configuration of the HDA.

It is desirable to store the product identification code within the HDA itself to allow subsequent access of the code during subsequent manufacturing and field use. One approach to storing the product information code within the HDA involves writing the code to a data sectors on a selected track, such as a non-user accessible guard band track. The product information code can then be accessed by instructing the disc drive to access the associated data sector and output the code to the host using the read/write channel circuitry. This approach is discussed, for example, by U.S. Pat. No. 6,154,790 issued Nov. 28, 2000 to Pruett, et al.

Another approach to storing the product information code within the confines of the HDA is to provide the HDA with a separate, dedicated non-volatile memory device (such as an electrically erasable, electrically programmable read only memory, EEPROM) which can be used to store and retain the product information code. A programmable processor on the disc drive PCBA can then read the dedicated non-volatile memory device in the HDA and transfer the code to the host device. This approach is discussed, for example, by U.S. Pat. No. 6,057,981 issued May 2, 2000 to Fish et al.

While operable, there are nevertheless limitations associated with these and other prior art approaches to storing a product information code within an HDA. As to the approach disclosed by Pruett et al., writing the product information code to a data sector on a hidden track generally requires the presence of the read/write channel circuitry to initially format the track to add the necessary data sectors in the area between adjacent servo fields, and then to write (and read verify) the product information code therein. However, since servo track writing is typically performed before attachment of the PCBA to the HDA, steps must be taken to connect an additional board to the HDA to provide the read/write channel electronics necessary to carry out this operation. This adds cost and delays to the manufacturing process. Moreover, such approach increases overhead in that it requires use of one or more data sectors that necessarily become unavailable for use to store user data or other control data for the drive.

Including a dedicated EEPROM within the HDA, as disclosed by Fish et al., provides advantages in that the product information code can be accessed quickly and easily without the need to first spin-up and access the discs. However, the addition of an EEPROM to the HDA undesirably adds cost to the disc drive and complexity to the programming code used by the drive.

Thus, there is a continual need for improvements in the art whereby product information relating to an HDA can be stored in and retrieved from the HDA in a fast and cost efficient manner. It is to such improvements that the present invention is directed.

SUMMARY OF THE INVENTION

The present invention is directed to an apparatus and method for writing a product information code (PIC) to a head-disc assembly (HDA) of a disc drive data handling system.

In accordance with preferred embodiments, the HDA comprises a housing which encloses a rotatable disc and a read/write head. The PIC is written to the HDA by initially configuring the code as a sequence of n multi-bit encoded words. Servo data are written to the disc as a number p of angularly spaced apart servo data fields. The servo data fields are subsequently transduced by the read/write head to provide the servo data to a servo control circuit of the disc drive to effect head positional control.

During the writing of the servo data to the disc, the n encoded words are distributed across the p servo data fields by selecting a subset of n servo data fields from the p data fields and writing each one of the n encoded words to a different one of the n servo data fields. In this way, the n encoded words replace at least a portion of the servo data in the n servo data fields.

Preferably, each of the p servo data fields comprises a Gray code field configured to store track address information for a track defined by said servo data field. The n encoded words are respectively written to the Gray code fields of the n servo data fields so that the n encoded words are provided in lieu of the track address information on the selected track.

In another related aspect, the PIC is preferably initially defined as a sequence of m typographical characters, such as alphanumeric characters 0–9, space (" "), and A–Z, expressed in accordance with the American Standard Code for Information Interchange (ASCII) code convention. The encoded words comprise the 7-bit ASCII code bits as well as additional parity bits formed from selected combinations of the ASCII code bits. In yet another aspect, the n encoded words include additional error correction words configured to detect and correct up to a selected number of errors during subsequent access of the n encoded words. In this way, the encoding of the initial PIC provides the resulting encoded words with error detection and correction capabilities.

The n encoded words are preferably written to non-adjacent servo data fields to enable the servo control circuit to better perform head positional control operations. To subsequently access the PIC, the head is moved to a position adjacent a selected track to which the n encoded words are stored, accumulating and decoding the encoded words, and then outputting the initial PIC to a host device.

These and various other features as well as advantages which characterize the present invention will be apparent from a reading of the following detailed description and a review of the associated drawings.

BRIEF DESCRIPTION OF THE DRAWINGS

FIG. 6 is a functional block diagram of the disc drive of FIG. 1, illustrating relevant electrical communication and control circuits on the disc drive PCBA and the operational coupling thereof with the HDA.

FIG. 7 generally shows the manner in which an encoded product information code is distributed among several non-adjacent servo fields on a selected track in accordance with a preferred embodiment.

FIGS. 8-1 and 8-2 provide a conversion table showing the manner in which the encoded product information code is stored in various servo position fields in accordance with preferred embodiments. For simplicity of reference, FIGS. 8-1 and 8-2 are collectively referred to as "FIG. 8."

FIG. 9 is a flow chart for a SERVO WRITE routine, illustrative of steps carried out in accordance with preferred embodiments to write the product information code to the HDA.

FIG. 10 is a flow chart for a PRODUCT INFORMATION CODE ACCESS routine, illustrative of steps carried out in accordance with preferred embodiments to subsequently read the product information code previously stored by the routine of FIG. 9.

DETAILED DESCRIPTION

Figure 1:
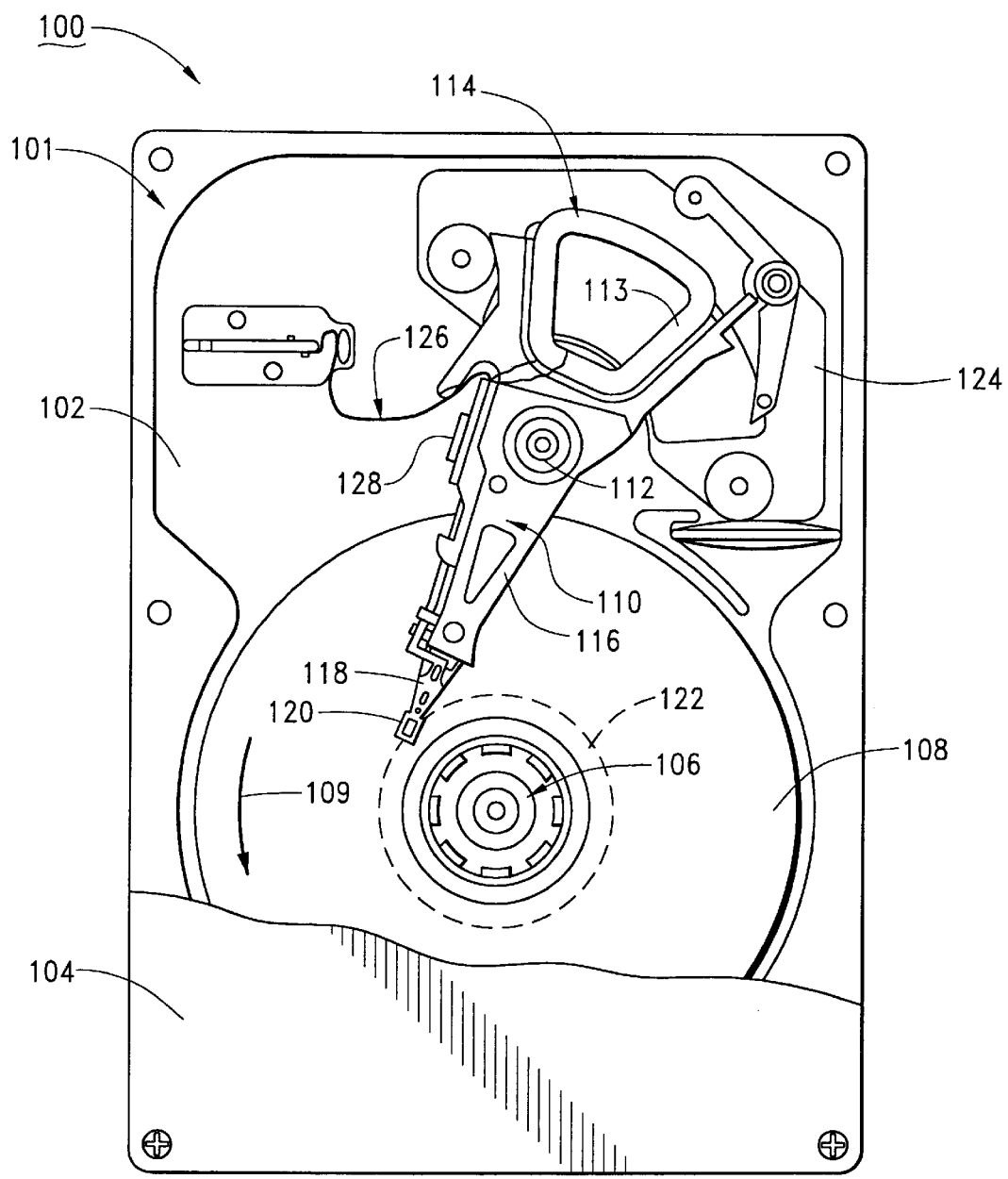
FIG. 1 is a top plan view of a disc drive constructed in accordance with preferred embodiments of the present invention, the disc drive having a head-disc assembly (HDA) to which a printed circuit board assembly (PCBA, not shown), is attached.

Referring to the drawings in general, and more particularly to FIG. 1, shown therein is a top plan view of a disc drive data handling system 100 (hereinafter "disc drive") constructed in accordance with preferred embodiments of the present invention. The disc drive 100 includes a head-disc assembly (HDA) 101 which houses various mechanical components of the disc drive 100, and a disc drive printed circuit board assembly (PCBA) which supports various electronic communication and control circuits. The PCBA is affixed to the underside of the HDA 101 and is therefore not visible in FIG. 1

The HDA 101 includes a base deck 102 which, in cooperation with a top cover 104 (shown in partial cut-away), forms an internal housing for the disc drive 100. A spindle motor 106 is supported within the housing to rotate a number of recording discs 108 in an angular direction indicated at 109.

An actuator 110 is provided adjacent the discs 108 and rotates about a cartridge bearing assembly 112 in response to the application of current to an actuator coil 113 of a voice coil motor (VCM) 114. The actuator 110 includes a number of rigid actuator arms 116 which support flexible suspension assemblies (flexures) 118. The flexures, in turn, support a corresponding number of read/write heads 120 adjacent the respective disc recording surfaces.

When the disc drive is deactivated, the heads 120 are brought to rest upon texturized landing zones 122 and the actuator 110 is secured using a latch 124. A flex circuit assembly 126 provides communication paths between the actuator 110 and the disc drive PCBA, and includes a preamplifier/driver circuit (preamp) 128 which provides write currents to the heads 120 during data writing operations, and read bias currents to the heads 120 during data reading operations.

It will be contemplated for purposes of the present discussion that the disc drive 100 is manufactured in a high-volume manufacturing environment wherein hundreds or thousands of nominally identical drives are produced on a daily basis. To facilitate efficient tracking of the assembled components within this manufacturing environment, each HDA is assigned a product information code comprising a serial number and/or other configuration code that uniquely identifies the HDA. For purposes of providing a concrete example, the product information code for the HDA 101 of FIG. 1 will be contemplated as comprising an eight (8) character alphanumeric serial number. The particular code assigned to the HDA 101 will be contemplated as the sequence "HP1D4C42."

Figure 2:
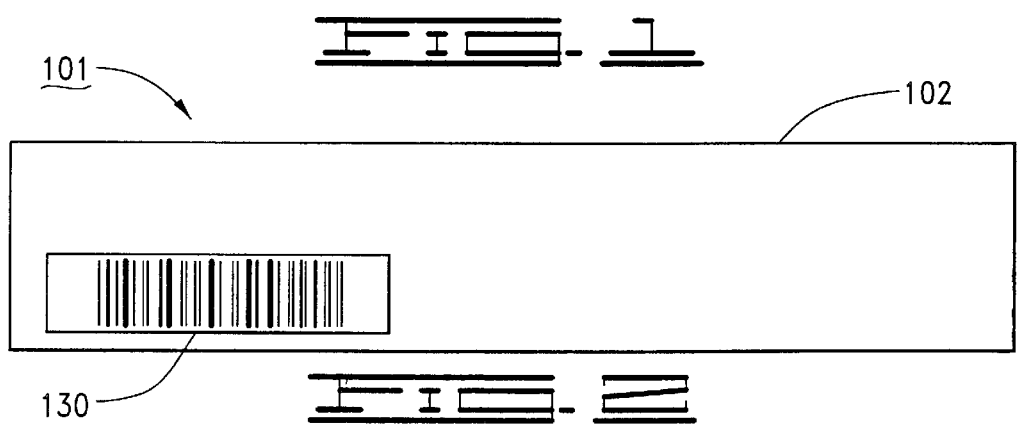
FIG. 2 is an elevational view of an exterior surface of the HDA illustrating the use of a label with a barcode that stores a unique product information code for the HDA.

FIG. 2 shows an elevational view of the HDA 101 of FIG. 1, illustrating an external barcode label 130 on which a barcode sequence is provided to correspond to the product information code assigned to the HDA. The label 130 is affixed to an exterior surface of the base deck 102 in a location that can be scanned by optical scanners (barcode readers) at various points in the manufacturing process.

Figure 3:
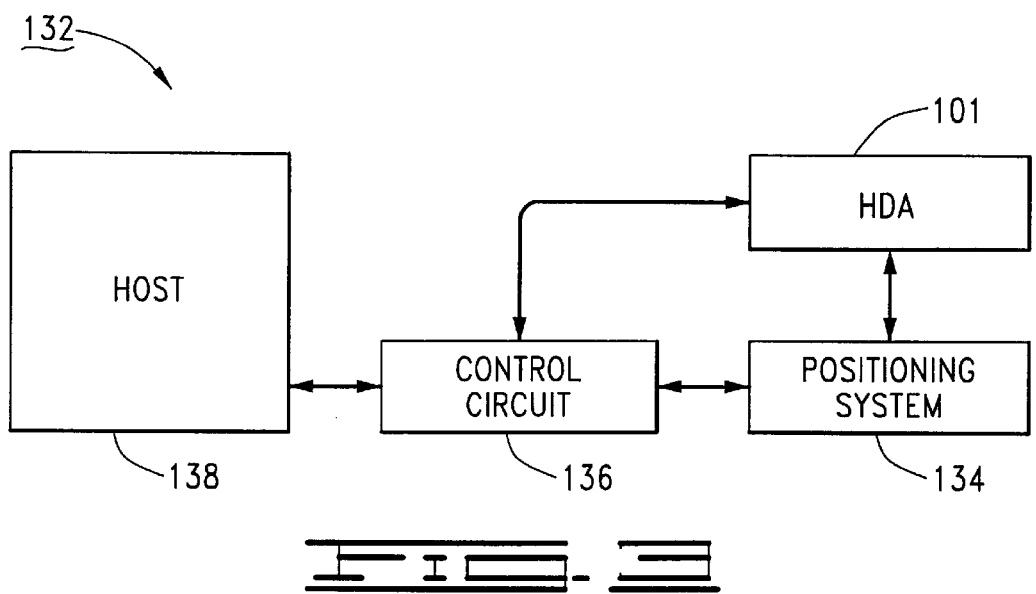
FIG. 3 is a functional block diagram of a servo track writing station used to write servo data to the HDA.

Of particular interest to the present discussion is a servo track writing portion of the HDA manufacturing process, during which servo data are written to the various disc surfaces. The servo data are provided for use by a servo control circuit of the disc drive 100 to control head position during subsequent operation. The servo data are preferably written prior to the mating of the disc drive PCBA to the HDA. FIG. 3 provides a functional block diagram for a servo track writing (STW) station 132 suitable for this purpose.

The STW station 132 includes a closed loop positioning system 134, a control circuit 136 and a host computer 138. As will be recognized, the positioning system 134 operates to controllably advance the actuator arms 116, and hence the heads 120, across the disc surfaces. The position system 134 preferably comprises a push pin assembly which projects through an aperture (not shown) in the base deck 102 and contactingly engages and advances the actuator 110. The position system 134 further includes a laser based optical position detector which precisely detects the radial position of the actuator 110 with respect to the discs 108.

The control circuit 136 interfaces with the positioning system 134 and provides head select and data write signals to the preamp 128 (FIG. 1) in the HDA 101 to direct the heads 120 to write the servo data in the desired locations on the discs 108. The host computer 138 provides top level control of the STW process along with a user interface to allow a user to initiate and control the STW process.

The manner in which the STW station 132 advantageously operates to write the product information code to the HDA 101 in accordance with preferred embodiments of the present invention will be discussed in detail below. At this point, however, it will be helpful to briefly review further aspects of the disc drive 100 and FIGS. 4–6 have been provided for this purpose.

Figure 4:
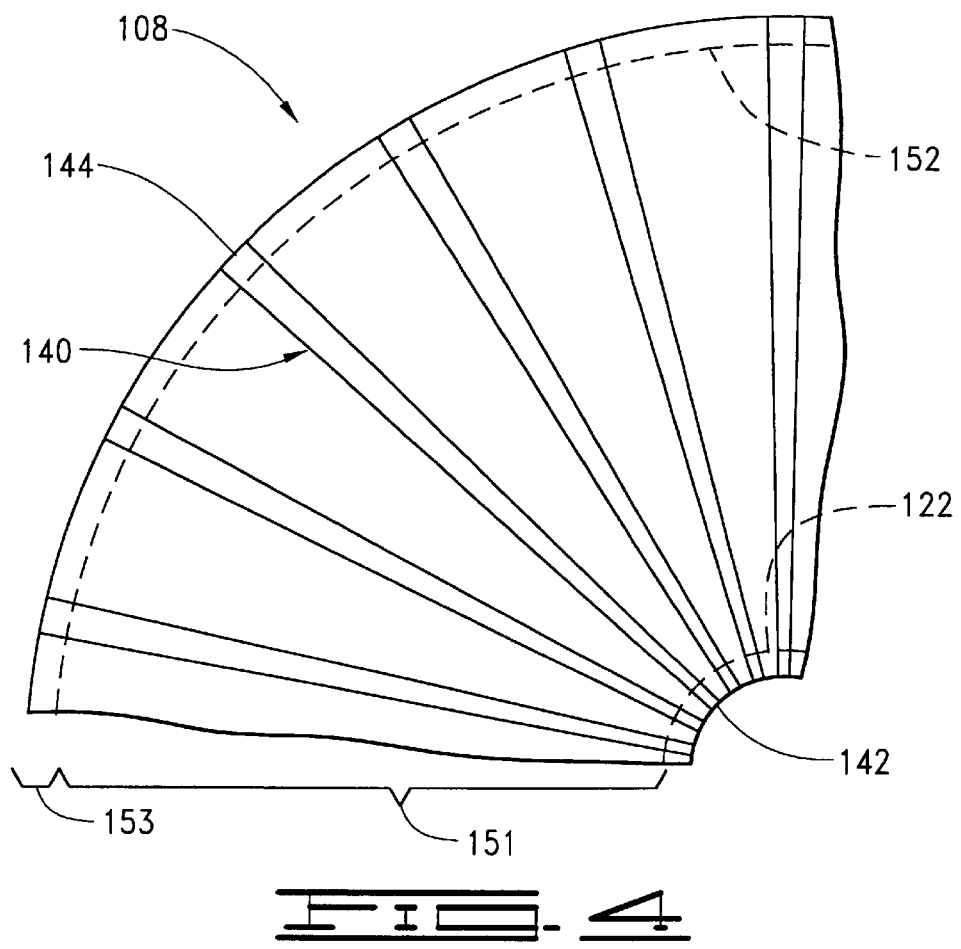
FIG. 4 shows the general manner in which servo data, in the form of servo fields arranged into radially extending servo wedges, are stored on each of the discs of the HDA.
Figure 5B:
FIG. 5 illustrates the general format for a selected track from the discs, said track including both servo fields which store servo data used by a servo control circuit for head positional control, and user data areas in which user data fields ("data sectors") are formed during a disc drive formatting operation to store user data.

The manner in which the servo data are arranged on each of the disc surfaces is illustrated by FIGS. 4 and 5. FIG. 4 shows a portion of one of the discs 108 with a number of spaced apart, radially extending servo wedges 140. The servo wedges 140 extend from an inner diameter 142 to an outer diameter 144 of the disc surface. The number of servo wedges 140 on each surface will depend based upon the requirements of a given application, but for purposes of the present discussion it will be contemplated that there are a total of 144 such wedges on each surface.

Each of the servo wedges 140 is made up of a number of adjacently disposed servo fields 146, as shown in FIG. 5. Particularly, FIG. 5 shows a portion of a track 148 defined by a number of the servo fields 146 at a selected radius on the disc 108. Data areas 150 are provided between each successive pair of the servo fields 146. Data fields ("data sectors," not shown) are subsequently formed in the user data areas 150 during a subsequent disc drive formatting operation.

With reference again to FIG. 4, it will be noted that a user data recording surface 151 constituting the user-accessible tracks to which user data are written is bounded by the landing zone 122 near the inner diameter of the disc 108 and a boundary 152 near the outer diameter of the disc 108. As will be recognized, increased data storage capacity for the disc drive 100 can be achieved by making the user data recording surface 151 as large as possible across the discs; nevertheless, it remains advantageous to reserve a few non-user accessible tracks ("hidden" or "guard band" tracks) outside the user data recording surface 151, such as in guard track region 153. Such guard band tracks can be provided with data sectors to store parametric configuration control data that are read by the disc drive 100 during initialization, and thereafter used as the heads 120 are moved to various locations adjacent the disc surfaces.

FIG. 5 further shows a preferred format for each of the servo fields 146. Particularly, each servo field 146 includes an automatic gain control (AGC) field 154, synchronization (sync) field 156, index field 158, Gray code (GC) field 160 and position field 162. The AGC field 154 stores an oscillating pattern (such as a 2T pattern) used to prepare the servo circuitry for remaining portions of the servo field 146; the sync field 156 stores a unique bit pattern that identifies the field as a servo field 146; the index field 158 indicates angular position of the head 120 with respect to the disc 108; the GC field 160 stores track address information to indicate radial position of the head 120; and the position field 162 comprises A, B, C and D dibit burst patterns to allow generation of a position error signal (PES) to identify inter-track head location. The formatting and use of each of these fields is well known and is discussed in greater detail, for example, in U.S. Pat. No. 5,262,907 issued Nov. 16, 1993 to Duffy et al. Of course, the representation of FIG. 5 is provided merely for purposes of illustration, as other servo field formats can be readily used.

Of particular interest to the present discussion is the format of the GC field 160. FIG. 5 shows this field to include a four-bit GC prefix field 164, eight-bit GC high field 166 and eight-bit GC low field 168. The GC prefix field 164 stores leading prefix information. The GC high and low fields 166, 168 are used together to store a 16-bit GC track address representation; thus, each track 148 on a disc surface has a unique 16-bit address word stored in each of the GC fields 160 on the track. For a more detailed discussion of the use of Gray code to indicate track addresses, see U.S. Pat. No. 6,091,560 issued Jul. 18, 2000 to Du.

FIG. 6 provides a generalized functional block diagram of the disc drive 100, and shows the interconnection of the HDA 101 with the communication and control electronic circuits on the disc drive PCBA. The PCBA is denoted by dashed box 170.

As shown in FIG. 6, the preamp 128 of the HDA 101 (previously shown in FIG. 1) communicates with a read/write channel 172, which in turn communicates with a host interface circuit 174 to transfer data between a host computer and the discs 108. A control processor 176 provides top level control of the disc drive 100 and uses both volatile and non-volatile memory to this end (such memory devices are collectively represented by MEM block 178).

A servo circuit 180 used to control head position includes a demodulator (demod) 182, a programmable digital signal processor (DSP) 184 with associated memory (MEM) 186, and a coil driver circuit 188. The demod 182 receives and conditions the servo data from the servo fields 146 (FIG. 5) for use by the DSP 184. The DSP 184 in turn evaluates the servo data and outputs current command signals to the coil driver 188 to perform head position control operations (seeking or track following). The coil driver 188 applies current to the coil 113 to pivot the actuator 110 and hence the selected head 120 across the associated disc surface in response to the applied current command signals.

Although the fully assembled disc drive 100 contains all of the systems shown in FIG. 6, it is contemplated that the PCBA 170 is not yet present and affixed to the HDA 101 during the servo track writing operation performed by the STW station 132 of FIG. 3. While the control circuit 136 of the STW station 132 has sufficient capability to direct the preamp 128 to apply the necessary write current signals to write the servo data shown in FIGS. 4–5 (and to subsequently verify the same), the STW station 132 is generally not configured to support the writing of the product information code to the discs 108 without the addition of further steps after the servo data have been written.

Such additional steps may require, for example, connecting a slave board that emulates the circuitry of the PCBA 170 (including servo circuit 180 and read/write channel 172); capturing the product information code, such as through the use of a scanner to read the code from the label 130 and input the same into the host computer 138; spinning up the discs 108; moving the heads 120 to an appropriate location, such as over the guard track area 153; formatting the tracks therein to include data sectors; and then writing the product information code to one or more such data sectors. However, these operations are time and resource intensive, and can contribute to a bottleneck in the manufacturing process.

Accordingly, the present invention provides an apparatus and associated methodology to write the product information code to existing servo position fields that would otherwise be used to store servo data used by the servo circuit 180. This is carried out by encoding the product information code to provide error detection and correction capabilities. The resulting encoded product information code is divided into a number of individual portions, or encoded words, and these encoded words are distributed to different, non-adjacent servo fields 146 on a selected track (or tracks). In this way, the encoded product information code is written across several selected servo fields 146. In a preferred embodiment, the encoded words are written to the GC high and low fields 166, 168 (FIG. 5) of the selected servo fields.

FIG. 7 generally illustrates a preferred approach to distributing the encoded words among the servo data fields 146. Particularly, FIG. 7 is a representation of all 144 servo fields 146 on a particular track, with the servo fields numerically designated in consecutive order. It will be noted that the data areas 150 between adjacent servo fields 146 shown in FIG. 5 have been omitted from FIG. 7 for clarity.

In this example, the encoded product information code is divided into ten encoded words, and every fourteenth servo field 146 is selected to store one of the encoded words; that is a different word is stored in the $14^{th}$, $28^{th}$, $42^{nd}$, . . . and $140^{th}$ servo fields (the selected servo fields are shown in cross-hatch). Such distribution allows the servo circuit 180 to maintain head positional control from the servo data contained in the remaining, non-selected servo fields (such as fields 1–13, etc.).

A preferred methodology for encoding the product information code will now be discussed using the exemplary code "HP1D4C42" selected above for the HDA 101 of FIG. 1. As will be recalled, in the present example the initial product information code is selected to be an eight character alphanumeric code, with each character selected from the following alphanumeric character set: {0–9, space (" "), and A–Z}. Each of these alphanumeric characters can be represented as a multi-bit digital value using the American Standard Code for Information Interchange (ASCII) code convention.

Figure 8:

To aid the present discussion, a conversion table is provided in FIGS. 8-1 and 8-2 (collectively referred to herein as "FIG. 8"). Column 190 of FIG. 8 lists each of the alphanumeric characters from the available alphanumeric character set, with a different character provided in each row. Column 192 shows the corresponding ASCII representation for each character in column 190. The ASCII representation requires seven bits for each alphanumeric character. These seven bits are denoted herein as $S_0, S_1, S_2 \ldots S_6$, with $S_0$ being the least significant bit (LSB) and $S_6$ being the most significant bit (MSB). Those skilled in the art will recognize that ASCII codes can be additionally provided with an eighth bit as a parity bit, but this eighth bit is unnecessary and therefore not used in the present example.

The characters in the eight character product information code are denoted as $K_1, K_2, K_3 \ldots K_8$. For the exemplary code HP1D4C42, it follows that $K_1$=H, $K_2$=P, $K_3$=1, $K_4$=D, $K_5$=4, $K_6$=C, $K_7$=4, and $K_8$=2. Table 1 lists the 7-bit ASCII codes from FIG. 8 for each of these characters in the exemplary code HP1D4C42:

TABLE 1

| PIC | $S_6$ | $S_5$ | $S_4$ | $S_3$ | $S_2$ | $S_1$ | $S_0$ |
|---|---|---|---|---|---|---|---|
| $K_1$ = H | 1 | 0 | 0 | 1 | 0 | 0 | 0 |
| $K_2$ = P | 1 | 0 | 1 | 0 | 0 | 0 | 0 |
| $K_3$ = 1 | 0 | 1 | 1 | 0 | 0 | 0 | 1 |
| $K_4$ = D | 1 | 0 | 0 | 0 | 1 | 0 | 0 |
| $K_5$ = 4 | 0 | 1 | 1 | 0 | 1 | 0 | 0 |
| $K_6$ = C | 1 | 0 | 0 | 0 | 0 | 1 | 1 |
| $K_7$ = 4 | 0 | 1 | 1 | 0 | 1 | 0 | 0 |
| $K_8$ = 2 | 0 | 1 | 1 | 0 | 0 | 1 | 0 |

In addition to the ASCII representation of each alphanumeric character, five parity bits denoted $P_0, P_1, P_2, P_3, P_4$, are generated according to the following relationships:

$$P_0 = S_0 \text{ XOR } S_1 \text{ XOR } S_2 \text{ XOR } S_3$$

$$P_1 = S_4 \text{ XOR } S_5 \text{ XOR } S_6$$

$$P_2 = S_2 \text{ XOR } S_3 \text{ XOR } S_4 \text{ XOR } S_5 \tag{1}$$

$$P_3 = S_0 \text{ XOR } S_1 \text{ XOR } S_6$$

$$P_4 = S_0 \text{ XOR } S_2 \text{ XOR } S_4 \text{ XOR } S_6$$

where XOR denotes the "exclusive-or" Boolean operand. The parity bits listed in column 194 of FIG. 8 correspond to the ASCII representations of column 192. Table 2 shows the parity bits calculated using equation (1) for the exemplary code HP1D4C42:

TABLE 2

| PIC | $P_3$ | $P_2$ | $P_1$ | $P_0$ | $P_4$ |
|---|---|---|---|---|---|
| $K_1 = H$ | 1 | 1 | 1 | 1 | 1 |
| $K_2 = P$ | 1 | 1 | 0 | 0 | 0 |
| $K_3 = 1$ | 1 | 0 | 0 | 1 | 0 |
| $K_4 = D$ | 1 | 1 | 1 | 1 | 0 |
| $K_5 = 4$ | 0 | 1 | 0 | 1 | 0 |
| $K_6 = C$ | 1 | 0 | 1 | 0 | 0 |
| $K_7 = 4$ | 0 | 1 | 0 | 1 | 0 |
| $K_8 = 2$ | 1 | 0 | 0 | 1 | 1 |

The seven bits from the ASCII representation together with the five parity bits calculated therefrom provide the necessary information to represent each character $K_1 \ldots K_8$ as a 16-bit word, as follows:

TABLE 3

| GC HIGH | | | | | | | | GC LOW | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| $P_3$ | $P_2$ | $P_1$ | 1 | $P_0$ | $P_4$ | $S_6$ | 1 | $S_5$ | $S_4$ | $S_3$ | 1 | $S_2$ | $S_1$ | $S_0$ | 1 |

The columns 166 and 168 in FIG. 8 correspond to the GC high and low fields with data encoded as shown in Table 3. Column 196 shows the hexadecimal representations of the 16-bits from columns 166, 168. The logical ones ("1's") at positions 0, 4, 8 and 12 provide run-length encoding to prevent timing recovery problems that might otherwise occur during long consecutive series of logical zeros ("0's"). Table 4 shows the contents of the GC high and low fields 166, 168 from FIG. 8 for the exemplary code HP1D4C42:

TABLE 4

| PIC | GC HIGH | GC LOW |
|---|---|---|
| | 15 14 13 12 11 10 9 8 | 7 6 5 4 3 2 1 0 |
| $K_1 = H$ | 1 1 1 1 1 1 1 1 | 0 0 1 1 0 0 0 1 |
| $K_2 = P$ | 1 1 0 1 0 0 1 1 | 0 1 0 1 0 0 0 1 |
| $K_3 = 1$ | 1 0 0 1 1 0 0 1 | 1 1 0 1 0 0 1 1 |
| $K_4 = D$ | 1 1 1 1 1 0 1 1 | 0 0 0 1 1 0 0 1 |
| $K_5 = 4$ | 0 1 0 1 1 0 0 1 | 1 1 0 1 1 0 0 1 |
| $K_6 = C$ | 1 0 1 1 0 0 1 1 | 0 0 0 1 0 1 1 1 |
| $K_7 = 4$ | 0 1 0 1 1 0 0 1 | 1 1 0 1 1 0 0 1 |
| $K_8 = 2$ | 1 0 0 1 1 1 0 1 | 1 1 0 1 0 1 0 1 |

Using the foregoing encoding scheme results in conversion of the original eight characters of the PIC into eight corresponding 16-bit encoded words.

An additional measure of robustness is added to the scheme by appending two identical error correction code (ECC) words to the eight encoded words for the original alphanumeric characters. These additional ECC words consist of checksum bits ($E_0$–$E_9$) of the eight PIC characters, along with two parity bits ($C_0$ and $C_1$).

The checksum bits are determined by adding the binary ASCII representation (shown in Table 1) of each alphanumeric character to obtain the ten bit checksum $E_9E_8E_7E_6E_5E_4E_3E_2E_1E_0$. For example, the sum of the exemplary code HP1D4C42 is 0111101010 (490 in decimal representation). Thus, the checksum bits are $E_9E_8E_7E_6E_5E_4E_3E_2E_1E_0$=0111101010.

The parity bits in the binary representation $C_1C_0$ represent the number of logical ones ("1's") in the $E_9E_8E_7E_6E_5E_4E_3E_2E_1E_0$ checksum bits (retaining the last two bits). That is, $$C_1C_0 = E_9 + E_8 + E_7 + E_6 + E_5 + E_4 + E_3 + E_2 + E_1 + E_0 \quad (2)$$

(number of 1s, retaining only last two bits)

Using the example $E_9E_8E_7E_6E_5E_4E_3E_2E_1E_0$=0111101010, the number of on six, which is 110 in binary numerals. Since the parity bits $C_1C_0$ retain only the last two bits, $C_1C_0$=10. The 16 bit ECC word format is set forth in Table 5:

TABLE 5

| GC HIGH | | | | | | | | GC LOW | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| $C_1$ | $C_0$ | $E_9$ | 1 | $E_8$ | $E_7$ | $E_6$ | 1 | $E_5$ | $E_4$ | $E_3$ | 1 | $E_2$ | $E_1$ | $E_0$ | 1 |

As with the encoded character word format of Table 3, the ECC words also have logical ones ("1's") at positions 0, 4, 8 and 12 to prevent run length error problems.

The above arrangement of $K_1$–$K_8$ with parity bits $P_0$–$P_4$ forms a linear block code (seven information bits and five parity bits) with a minimum weight of three. Therefore, each character in conjunction with its parity bits has two bit error detection capability or one bit error correction capability. The two identical ECC words in conjunction with the associated parity bits has three bit error detection capability or one bit error correction capability.

Since the PIC is selected from the alphanumeric character set 0–9, space (" "), and A–Z, additional information is available for error detection since detected value outside this set are immediately detectable as errors. As can be seen from a review of column 190 in FIG. 8, the hexadecimal representations of the alphanumeric character set are 30h–39h, 20h, and 41h–5Ah. Thus, decoded values outside this range can be immediately detected as erroneous.

It will now be understood that the encoding of the original PIC converts eight characters of 7-bits each into ten encoded words of 16-bits each. Of the ten encoded words, the first eight correspond to the original eight alphanumeric characters and have a format as shown in Table 3 (these eight encoded words are referred to herein as "encoded character words"); the remaining two encoded words are identical ECC words each having a format as shown in Table 5.

Decoding the assembled sequence of ten encoded words is relatively straightforward. First, a parity check is performed on each of the eight encoded character words using equation (1) and on both of the ECC words using equation (2). The checksum of the decoded ASCII characters is then compared to the $E_9 \ldots E_0$ sequence. If these steps are successful, the decoding operation is completed and the original eight character PIC is output by the drive 100.

If the foregoing steps are unsuccessful, however, it will be noted that the encoded character words have 2 bits of error detection or 1 bit of error correction capability, and the ECC words have 3 bits of error detection or 1 bit of error correction capability. Thus, the complete set of ten encoded words will have 2 bits of error correction or 5 bits of error detection capability.

As to the capability of correcting up to 2 bit errors, it is noted as follows:

1. If 2 bit errors occur in the ECC words, the checksum of the 8 characters $K_1 \ldots K_8$ in the unaffected encoded character words will provide the correct ECC bits $E_9 \ldots E_0$, and the parity bits $C_1$, $C_0$ can be determined therefrom.

2. If 1 bit error occurs in one of the encoded character words and 1 bit error occurs in an ECC word (or another encoded character word), the respective parity bits in these words will enable correction of the errors since each word has 1 bit of error correction capability.

3. If 2 bit errors occur in the same encoded character word, the ECC checksum minus the sum of the remaining seven unaffected encoded character words will be the correct value of the erroneous encoded character word.

Decoding can be performed using precalculated lookup tables as desired to reduce the need for on-the-fly calculations.

As to the capability to detect up to 5 bit errors, the complete sequence of 10 encoded words has the capability of correcting 2 bit errors. The sequence thus has a minimum distance of at least 5, so that at least 4 bit errors can be detected. Table 6 illustrates the various possible combinations of 5 bit errors between the encoded character words and the ECC words, and shows how the 5 bit errors in each of these situations can be detected:

TABLE 6

| No. of Encoded Character Word Bit Errors | No. of ECC Word Bit Errors | At Least One Encoded Character Word Fails Parity Check? | At Least One ECC Word Fails Parity Check/Checksum Verification Fails? | Can All 5 Bit Errors Be Detected? |
|---|---|---|---|---|
| 5 | 0 | Unknown | Yes | Yes |
| 0 | 5 | No | Yes | Yes |
| 4 | 1 | Unknown | Yes | Yes |
| 1 | 4 | Yes | Unknown | Yes |
| 3 | 2 | Unknown | Yes | Yes |
| 2 | 3 | Yes | Yes | Yes |

FIG. 9 provides a flow chart for a SERVO DATA AND PIC WRITE routine 200, illustrative of steps carried out in accordance with preferred embodiments of the present invention to write servo data to a disc surface of the HDA 101 and to embed the product information code within the servo data. It will be understood that the routine of FIG. 9 is preferably carried out using the STW station 132 of FIG. 3.

As shown at step 202, the HDA 101 is provided to the STW station 132 and mounted therein. The unique product information code (PIC) associated with the HDA 101 is captured at step 204 by, for example, optically scanning the barcode label 130 (FIG. 2). The PIC is broadly characterized as a sequence of m typographical characters which can include, but is not limited to, the alphanumeric character set discussed above. Using this convention, m=8 for the exemplary code HP1D4C42.

At step 206, the PIC is encoded to form a corresponding sequence of n multi-bit encoded words. The preferred encoding scheme discussed above provides eight encoded character words and two ECC words for the exemplary code HP1D4C42, and so in this case n=10.

The routine proceeds at step 208 to write servo data to a number of p angularly spaced apart servo data fields (146 in FIG. 5) in a generally conventional fashion using the STW station (132 in FIG. 3). As discussed above, the HDA 101 is contemplated as having 144 servo data fields per disc revolution, and so in the present example p=144.

The n encoded words from step 206 are also distributed among the p servo data fields during step 208. This is carried out by selecting a subset of n servo data fields from the p servo data fields (as shown by FIG. 7), and then writing each one of the n encoded words to a different one of the n servo data fields so that the encoded words are provided in lieu of a portion of the servo data that would have otherwise been provided to the servo data fields. The routine thereafter ends at 210.

As discussed above, in a preferred embodiment the encoded words are written to the GC field 160 shown in FIG. 5; more specifically, the 16-bit encoded words are provided in the high and low GC fields 166, 168. One or more bits are further preferably set in the GC prefix field 164 (FIG. 5) to indicate that the associated GC high and low fields 166, 168 contain encoded data and not Gray code, as would otherwise be provided in these fields. This allows the servo circuit 180 to not treat the contents of the GC fields 166, 168 as a track address and instead accumulate the contents for decoding. Of course, the present invention is not necessarily limited to use of the GC field; other locations within the servo data fields normally used to provide head positional control information to the servo circuit 180 can be used in lieu of the GC field 160, such as the index field 158.

Because the encoded words replace data that the servo circuit 180 would have otherwise relied upon to detect and control head position, it is preferable that the n servo data fields be non-adjacent to one another, as shown in FIG. 7. In this way, the servo circuit 180 can better operate to maintain head position from the servo data in the remaining servo data fields.

The subset of n servo data fields are preferably on a guard band track (such as in region 153 of FIG. 3) beyond the user data recording surface 151. Alternatively, however, the n servo data fields can be selected from a user-accessible track within the user data recording surface 151. Finally, it will be noted that step 208 may be repeated a number of times to provide multiple sets of the encoded data on different tracks on the same disc surface, as well as on one or more tracks on different disc surfaces.

Reference is now made to FIG. 10, which provides a flow chart for a PIC ACCESS routine 220, illustrative of steps subsequently carried out to access the PIC previously written to the HDA 101 during the routine of FIG. 9. Whereas the routine of FIG. 9 was contemplated as preferably carried out during the STW process, the routine of FIG. 10 can be carried out at appropriate times during the subsequent manufacturing process or during subsequent field use of the disc drive 100.

As shown at step 222, the routine starts by moving the appropriate head 120 over a selected track to which the encoded PIC has been written. The servo circuit 180 proceeds to initiate a track follow mode of operation whereby the head 120 continuously reads the servo data fields 146 on the selected track over each disc revolution and provides the servo data therefrom to the servo circuit 180. In response, the servo circuit 180 operates to maintain the head in a desired fixed relation over the track. At such time that the beginning of the sequence of encoded words is noted, the servo circuit 180 further proceeds to accumulate the contents of the selected n servo data fields to obtain the n encoded data words.

Preferably, with reference again to FIG. 6, this is carried out as follows. Each servo data field 146 on the selected head is read in turn by the head 120. After preamplification by the preamp 128, the transduced data are provided to the read/write channel 172. In this embodiment, an automatic gain control (AGC) stage (not shown) within the read/write channel 172 will be tuned by the oscillating pattern of the AGC field 154 (FIG. 5) to prepare for the receipt of the remaining servo data.

Detection of the synchronization data from the sync field 156 will indicate that the data are from a servo data field 146; thus, the contents of the remaining index field 158, GC field 160 and position field 162 will be directed by the read/write channel 172 to the demod 182, which will in turn condition and pass the contents of these fields to the DSP 184 for further processing.

For those n servo data fields containing the encoded words, the indicator bits provided in the GC prefix fields 164 will signal the DSP 184 to not treat the contents of the GC high and low fields 166, 168 as track address data, but rather to temporarily accumulate the contents of these fields in MEM 186. Thus, at the conclusion of the operation of step 224 of FIG. 10, the DSP 184 will have accumulated all of the n encoded words from the selected track, and will proceed with decoding of the same in the background while continuing to servo the head 120 on the selected track.

As shown at step 226, the DSP 184 proceeds to decode the encoded words in an attempt to recover the original PIC characters (in ASCII format). Such decoding preferably takes place as discussed above and includes parity check, checksum verification and error correction operations as necessary. Decision step 228 inquires whether the PIC is successfully decoded; if so, the routine passes down to step 230 wherein the parity bits are stripped and the original PIC ASCII representations are output to the host device, after which the routine ends at step 232.

On the other hand, when the decoding step 226 is unsuccessful, that is, uncorrectable errors remain in the encoded words, the routine passes from decision step 228 either back to step 224 (when a retry is desired using the same head/track combination), or to step 236 (when a new track on the same or a different disc surface containing another set of the encoded words is desired). The routine will thus continue attempting to decode the encoded words until the PIC is successfully recovered, or until the effort is abandoned and an error is declared, as shown by step 238.

It will now be understood that the present invention is directed to an apparatus and method for writing a product information code (PIC) to a head-disc assembly (HDA) 101 of a disc drive data handling system 100. In one aspect of the invention, the HDA 101 comprises a housing (102, 104) which encloses a rotatable disc 108 and a read/write head 120. The method comprises steps of (a) configuring the product information code as a sequence of n multi-bit encoded words (step 206, FIG. 9); writing servo data to the disc as a number p of angularly spaced apart servo data fields 146, wherein the p servo data fields are configured to be subsequently transduced by the read/write head to provide the servo data to a servo control circuit 180 of the disc drive to effect head positional control (step 208, FIG. 9); and (c) distributing the n encoded words across the p servo data fields by selecting a subset of n servo data fields from the p data fields and writing each one of the n encoded words to a different one of the n servo data fields so that the n encoded words replace at least a portion of the servo data in the n servo data fields (step 208, FIG. 9).

In a related aspect of the present invention, each of the p servo data fields comprises a Gray code field (160; 164, 166, 168) configured to store track address information for a track defined by said servo data field, and wherein the n encoded words are respectively written to the Gray code fields of the n servo data fields so that the n encoded words are provided in lieu of the track address information.

In another related aspect, the method further comprises a prior step of providing the product information code as a sequence of m typographical characters (step 204, FIG. 9), so that the configuring step (a) comprises a step of encoding the sequence of m typographical characters to provide the corresponding sequence of n encoded words.

In yet another related aspect, the m typographical characters are each expressed as a 7-bit American Standard Code for Information Interchange (ASCII) code, and the encoded words comprise the seven ASCII code bits as well as additional parity bits formed from selected combinations of the ASCII code bits. In yet another aspect, the n encoded words include additional error correction words configured to detect and correct up to a selected number of errors during subsequent access of the n encoded words.

In another related aspect, the present invention is directed to a disc drive data handling system 100 comprising a printed circuit board assembly 170 supporting communication and control electronics (172, 174, 176, 178, 180) for the disc drive including a servo circuit 180; and a head-disc assembly (HDA) 101 coupled to the printed circuit board assembly. The HDA preferably comprises a housing (102, 104); a controllably positionable read/write head 120 supported within the housing; and a rotatable disc 108 supported within the housing on which servo data are stored to define a plurality of tracks 148.

The servo data are provided in p servo data fields 146 on each track and used by the servo circuit to position the read/write head adjacent said track. A product information code (PIC) selected to uniquely identify the head-disc assembly is stored as a sequence of n multi-bit encoded words in a selected subset of n servo data fields from the p data fields of a selected track so that the n encoded words replace at least a portion of the servo data in the n servo data fields.

In a related aspect, each of the p servo data fields comprises a Gray code field configured to store track address information for the track defined by the servo data in said servo data field, and the n encoded words are respectively written to the Gray code fields of the n servo data fields so that the n encoded words are provided in lieu of the track address information.

In another related aspect, the PIC is initially expressed as a sequence of m typographical characters which are encoded to provide the n encoded words. In another aspect, the m typographical characters are each expressed as a 7-bit American Standard Code for Information Interchange (ASCII) code and the n encoded words include the 7-bits from the associated ASCII code as well as at least one additional parity bit determined from a selected combination of the 7-bits.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for writing a product information code to a head-disc assembly of a disc drive, the head-disc assembly comprising a housing which encloses a rotatable disc and a read/write head, the method comprising steps of:

(a) configuring the product information code as a sequence of n multi-bit encoded words;

(b) writing servo data to the disc as a number p of angularly spaced apart servo data fields, wherein the p servo data fields are configured to be subsequently transduced by the read/write head to provide the servo data to a servo control circuit of the disc drive to effect head positional control; and (c) distributing the n encoded words across the p servo data fields by selecting a subset of n servo data fields from the p data fields and writing each one of the n encoded words to a different one of the n servo data fields so that the n encoded words replace at least a portion of the servo data that would have otherwise been provided in the n servo data fields during the operation of writing step (b).

2. The method of claim 1, wherein each of the p servo data fields comprises a Gray code field configured to store track address information for a track defined by said servo data field, and wherein the n encoded words are respectively written to the Gray code fields of the n servo data fields so that the n encoded words are provided in lieu of the track address information.

3. The method of claim 1, further comprising a prior step of providing the product information code as a sequence of m typographical characters, and wherein the configuring step (a) comprises a step of encoding the sequence of m typographical characters to provide the corresponding sequence of n encoded words, wherein n is greater or equal to m.

4. The method of claim 3, wherein the m typographical characters are each expressed as a 7-bit American Standard Code for Information Interchange (ASCII) code.

5. The method of claim 3, wherein n>m and the n encoded words include error correction words configured to detect and correct up to a selected number of errors during subsequent access of the n encoded words.

6. The method of claim 1, wherein each of the n servo data fields is non-adjacent to the remaining ones of the n servo data fields so that, during subsequent access of the n encoded words, as each of the n servo data fields is accessed in turn, servo data from at least one of the remaining p-n servo data fields are provided to the servo circuit before a next one of the n servo data fields is accessed.

7. The method of claim 1, wherein the p servo data fields are all disposed on a selected track at a selected radius on the disc.

8. The method of claim 7, wherein the selected track is characterized as a non-user accessible track, wherein data fields are defined between adjacent ones of the p servo data fields, and wherein at least one of the data fields is used to store parametric control data used to configure the disc drive during operation.

9. The method of claim 7, wherein the selected track is characterized as a user accessible track, wherein data fields are defined between adjacent ones of the p servo data fields, and wherein the data fields are configured to store user data.

10. The method of claim 7, wherein steps (b) and (c) are repeated for a different track at a different radius on the disc so that multiple sets of the encoded words are provided within the head-disc assembly.

11. The method of claim 1, wherein the product information code is subsequently accessed by further steps of:

(d) moving the read/write head to a desired relation adjacent a selected track having the p servo data fields;

(e) accumulating the n encoded words from the n servo data fields while using the servo data from the remaining p-n servo data fields to maintain the read/write head in the desired relation adjacent the selected track; and (f) outputting the product information code from the n encoded words obtained from the accumulating step (e).

12. A disc drive data handling system, comprising:

a printed circuit board assembly supporting communication and control electronics for the disc drive including a servo circuit; and a head-disc assembly coupled to the printed circuit board assembly, comprising:
a housing;

a controllably positionable read/write head supported within the housing; and a rotatable disc supported within the housing on which servo data are stored to define a plurality of tracks, wherein the servo data are provided in p servo data fields on each track and used by the servo circuit to position the read/write head adjacent said track, and wherein a product information code which uniquely identifies the head-disc assembly is stored as a sequence of n multi-bit encoded words in a selected subset of n servo data fields from the p data fields of a selected track so that the n encoded words replace at least a portion of the servo data in the n servo data fields.

13. The disc drive of claim 12, wherein each of the p servo data fields comprises a Gray code field configured to store track address information for the track defined by the servo data in said servo data field, and wherein the n encoded words are respectively written to the Gray code fields of the n servo data fields so that the n encoded words are provided in lieu of the track address information.

14. The disc drive of claim 12, wherein the product information code is initially expressed as a sequence of m typographical characters which are encoded to provide the n encoded words.

15. The disc drive of claim 14, wherein the m typographical characters are each expressed as a 7-bit American Standard Code for Information Interchange (ASCII) code and wherein the n encoded words include the 7-bits from the associated ASCII code as well as at least one additional parity bit determined from a selected combination of the 7-bits.

16. The disc drive of claim 15, wherein n>m so that the n encoded words include additional error correction words configured to detect and correct up to a selected number of errors during subsequent access of the n encoded words.

17. The disc drive of claim 12, wherein each of the n servo data fields is non-adjacent to the remaining ones of the n servo data fields so that, during subsequent access of the n encoded words, as each of the n servo data fields is accessed in turn, servo data from at least one of the remaining p-n servo data fields are provided to the servo circuit before a next one of the n servo data fields is accessed.

18. The disc drive of claim 12, wherein the selected track is characterized as a non-user accessible track, wherein data fields are defined between adjacent ones of the p servo data fields, and wherein at least one of the data fields is used to store parametric control data used to configure the disc drive during operation.

19. The disc drive of claim 12, wherein the selected track is characterized as a user accessible track, wherein data fields are defined between adjacent ones of the p servo data fields, and wherein the data fields are configured to store user data.

20. The disc drive of claim 12, wherein the n encoded words are additionally written to at least one additional track on the disc so that multiple sets of the encoded words are provided within the head-disc assembly.

21. A method comprising configuring a sequence of n multi-bit encoded words as a product information code, and distributing the product information code across a portion of a plurality of servo data fields while writing the servo fields to a disc.

* * * * *